(12) United States Patent
Lehmann et al.

(10) Patent No.: US 7,926,526 B2
(45) Date of Patent: Apr. 19, 2011

(54) TRANSPONDER FOR TIRES

(75) Inventors: Jörg Lehmann, Hannover (DE); Alfons Doerr, Stuttgart-Degerloch (DE); Heiko Grünberg, Burgdorf/Otze (DE)

(73) Assignee: Continental Aktiengesellschaft, Hannover (DE)

( * ) Notice: Subject to any disclaimer, the term of this patent is extended or adjusted under 35 U.S.C. 154(b) by 1321 days.

(21) Appl. No.: 10/559,616

(22) PCT Filed: Apr. 17, 2004

(86) PCT No.: PCT/EP2004/004110
§ 371 (c)(1),
(2), (4) Date: Jun. 7, 2006

(87) PCT Pub. No.: WO2004/108439
PCT Pub. Date: Dec. 16, 2004

(65) Prior Publication Data
US 2006/0278313 A1     Dec. 14, 2006

(30) Foreign Application Priority Data
Jun. 5, 2003   (DE) .................................. 103 25 423

(51) Int. Cl.
*B60C 23/00*     (2006.01)

(52) U.S. Cl. .................................................. 152/152.1
(58) Field of Classification Search ............... 152/152.1
See application file for complete search history.

(56) References Cited

U.S. PATENT DOCUMENTS

| | | | | |
|---|---|---|---|---|
| 5,500,065 | A * | 3/1996 | Koch et al. | 156/110.1 |
| 6,217,683 | B1 * | 4/2001 | Balzer et al. | 152/152.1 |
| 2007/0018804 | A1 * | 1/2007 | Strache et al. | 152/152.1 |

FOREIGN PATENT DOCUMENTS

| | | |
|---|---|---|
| DE | 44 26 022 | 2/1996 |
| EP | 0 936 089 | 8/1999 |
| JP | 09-136517 | * 5/1997 |
| JP | 2001-308741 | * 11/2001 |
| WO | WO 00/47430 | 8/2000 |
| WO | WO 01/25034 | 4/2001 |
| WO | WO 03/070496 | 8/2003 |

* cited by examiner

*Primary Examiner* — Steven D Maki
(74) *Attorney, Agent, or Firm* — Walter Ottesen

(57) ABSTRACT

The invention relates to a transponder that is mounted on a tire. The transponder includes at least one transponder chip and a transponder antenna and is embedded in a substrate which is connected to an inner side of the tire with the aid of an element. The aim of the invention is to provide a transponder with the highest possible durability. To achieve this, the connecting element is a material strip which is only fixed to the inner side of the tire in one sub-section.

6 Claims, 1 Drawing Sheet

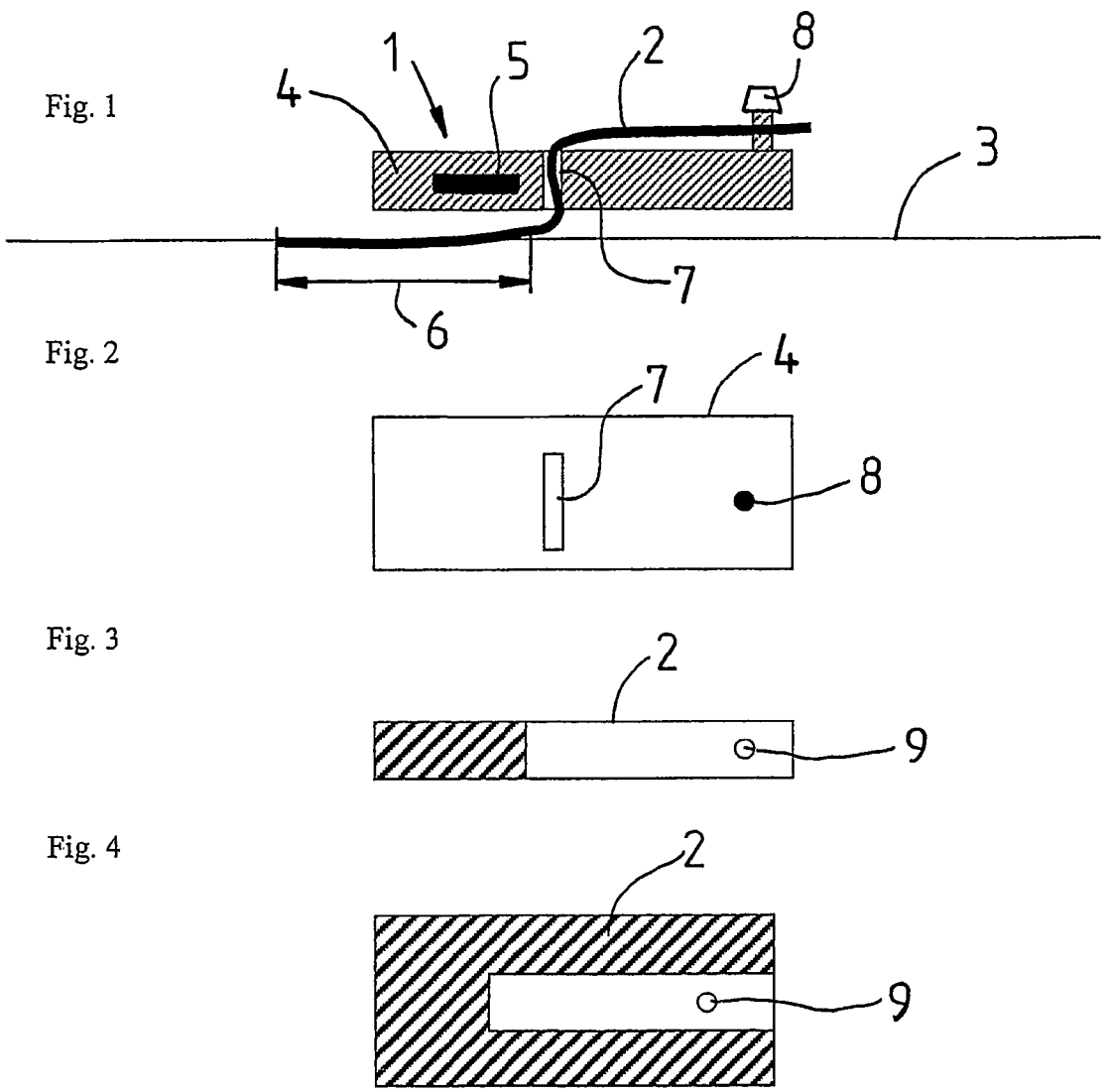

TRANSPONDER FOR TIRES

RELATED APPLICATION

This application is the national stage of PCT/EP 2004/004110, filed Apr. 17, 2004, designating the United States and claiming priority from German patent application no. 103 25 423.4, filed Jun. 5, 2003, the entire contents of which are incorporated herein by reference.

FIELD OF THE INVENTION

The invention relates to a transponder which is applied to a tire. The transponder includes at least one transponder chip as well as a transponder antenna and is embedded in a substrate. The substrate is connected to the inner side of a tire via connecting means.

BACKGROUND OF THE INVENTION

Transponders are utilized in tires for various tasks. This includes especially a tire identification with which an automobile manufacturer, inter alia, can rapidly as well as automatically determine from which tire factory a specific tire was delivered. Other tasks can include an air pressure monitoring, a temperature measurement, the measurement of mechanical stress conditions in the tire or a measurement of the distance traveled by the tire. Modern transponders include an electronic component or electronic chip in which sensor elements can be mounted as well as an antenna connected to the electronic component.

One problem with tire transponders is associated with the arrangement of the transponder in the tire. German patent publication 4,426,022 discloses, for example, a transponder which is mounted in a so-called container which, in turn, is glued fixedly to the inner side of the tire. The container, which has the function of a housing, as well as the stiffer carrier layer, which lies between the transponder and the inner side of the tire, are fixedly connected to the transponder. An essential disadvantage of this composite arrangement comprises that high loads are transmitted to the transponder in the operating state of the tire because of the occurring deformations. These high loads lead either to damage of the transponder antenna or to a breakage of the connecting interface between the transponder chip and the transponder antenna. The transponder can then no longer be utilized for data transmission because of the irreversible damage. A further disadvantage is that the transponder, which is connected material tight to the inner side of the tire, cannot be easily disassembled again or be replaced when there is an electric defect. During the disassembly or exchange of such transponders, the inner layer of the inner side of the tire would be irreversibly damaged and therefore the tire would be destroyed.

SUMMARY OF THE INVENTION

The task of the invention is to provide a transponder which can be built into a tire and which has the highest possible durability and is easily mountable.

The task of the invention is solved in accordance with the invention in that the connecting means is a material strip tightly connected to the inner side of the tire only in at least one component region of the connecting means.

An advantage of the invention is especially seen in that the loads acting on the transponder and the substrate are significantly reduced by the type of connection in accordance with the invention. With this arrangement in accordance with the invention, the portion of the thrust stresses and normal stresses transmitted to the transponder are negligibly small. This effect applies likewise for the bending load which acts on the transponder during operation of the tire and is considerably reduced by the targeted decoupling. In this way, the transponder has overall a significantly higher durability. A further significant advantage is the simple retrofit of the tire with a transponder. In tire manufacture, all tires can be provided with the material strip of the invention as a measure of prevention. Only after delivery of the finally manufactured tire to the particular customer can a decision be made as to whether the tire should be equipped with a transponder. Thereafter, the transponder can be attached to the tire in a simple manner with the material strip.

In an advantageous further embodiment of the invention, it is provided that the material strip is connected to the substrate via a substrate opening. In this way, the transponder, which is embedded in the substrate, can be connected in a simple manner to the material strip.

In a further advantageous embodiment of the invention, it is provided that the substrate has a fixing means projecting to attach the material strip. The fixing means has the function to fix the material strip to the substrate and can be easily manufactured.

In a further advantageous embodiment of the invention, it is provided that the material strip has a material strip opening with which the material strip is fixed to the fixing means of the substrate. The material strip opening on the material strip can be produced by a simple punching out.

In a further advantageous embodiment of the invention, it is provided that the substrate opening has a rectangular shape and has rounded or beveled edges. The durability of the material strip is increased by the soft transitions formed in this way.

In a further advantageous embodiment of the invention, it is provided the material strip is made of a rubber product. In this way, the transponder, which is embedded in the substrate, is pressed with a slight pressure against the inner side of the tire.

In a further advantageous embodiment of the invention, it is provided that the substrate lies entirely on the material strip. In this way, the inner layer of the inner side of the tire is protected against damage.

In a further advantageous embodiment of the invention, it is provided that the substrate has a rounded form on the side directed toward the inner side of the tire. Because of the rounded form, the transponder, which is embedded in the substrate, touches the inner side of the tire only in a small component region during a "Latschdurchlauf".

In a further advantageous embodiment of the invention, it is provided that the material strip is applied to the inner side of the tire in advance of the tire vulcanization. In this way, the placement of the material strip takes place in a simple manner directly during production of the tire on the tire assembly drum.

In a further advantageous embodiment of the invention, it is provided that the material strip is applied after tire vulcanization via a cold vulcanization on the inner side of the tire of the completely manufactured tire. The cold vulcanization makes possible a simple retrofit of an already manufactured tire with the material strip of the invention.

BRIEF DESCRIPTION OF THE DRAWING

The invention will now be described with reference to the drawings wherein:

FIG. 1 is an arrangement of the transponder, which is embedded in the substrate, with the material strip in a side elevation view;

FIG. 2 shows a transponder in plan embedded in a substrate;

FIG. 3 shows a material strip in plan of the invention; and,

FIG. 4 shows a further embodiment for a material strip mounted on the inner side of the tire.

DESCRIPTION OF THE PREFERRED EMBODIMENTS OF THE INVENTION

FIG. 1 shows a transponder 1 embedded in a substrate 4 and mounted on the inner side 3 of a tire. The transponder 1 is made up of a transponder chip 5 and an antenna coil (not shown in the FIG.) which are embedded in a substrate 4. The substrate 4 has the function of a housing and can be made, for example, from an epoxy resin, a plastic, rubber or an elastomer. The FIG. is a cross-sectional view. The material strip 2 is connected to the inner side 3 of the tire only in the component region 6, for example, in that the material strip 2 is vulcanized with the inner side 3 of the tire in this component region 6 during tire manufacture and is in this way pressed into the inner side 3 of the tire. The projecting remaining portion of the material strip 2 is, in contrast, covered with a suitable foil between the material strip 2 and the inner side 3 of the tire in order to prevent a material-tight connection to the inner side 3 of the tire in this part. After tire manufacture, the transponder 1 with the substrate 4 surrounding the same is connected to the free end of the material strip 2. For this purpose, the free end of the material strip 2 is pulled through the substrate opening 7 and thereafter is attached to the projecting fixing means 8 of the substrate 4. The material strip 2 comprises a rubber product material whereby it has elastic characteristics and presses the transponder 1, which is embedded in the substrate 4, against the inner side 3 of the tire with a slight tension. The fixing means 8 is so configured that the free end of the material strip 2 cannot by itself become separated, for example, because of the button-like form. Instead of the right angle edges, the opening 7 can have rounded or inclined running edges whereby the material strip 2 lies against the substrate 4 in a better manner and the durability of the material strip 2 is increased.

FIG. 2 shows the transponder in plan with the transponder being embedded in the substrate 4. The substrate opening 7 for the material strip is essentially rectangular in shape and the fixing means 8 is preferably of circular shape.

FIG. 3 shows the material strip of the invention in plan without the transponder. The material strip 2 is fixedly connected to the inner side of the tire only in the hatched region. The circularly-shaped opening is the material strip opening 9 for attaching to the fixing means of the substrate.

FIG. 4 shows in plan a further embodiment of the material strip 2 of the invention without the transponder. In this embodiment, the material strip has approximately the dimensions of the substrate 4. Here too, only the hatched portion is fixedly attached to the inner side of the tire. The substrate, which surrounds the transponder, does not come into contact with the inner side of the tire in this embodiment whereby the inner side of the tire is additionally protected against damage.

The strip 2 has a first portion defining a first longitudinal end and a second portion defining a second longitudinal end. The second portion has a middle tab so as to have leg segments on respective sides thereof. The first portion and the leg segments of the second portion are fixedly connected to the inner wall surface 3 of the tire. The middle tab is clear of and unattached to the inner wall surface 3 of the tire. The substrate 4 has a clear-through opening 7 formed therein through which the middle tab passes from below the substrate 4. The middle tab is releasably connected to the substrate 4 at the upper surface thereof so as to enable the substrate 4 to lie on the first portion and the leg segments thereby avoid a direct contact of the substrate 4 with the inner wall surface 3 of the tire.

REFERENCE NUMERALS (This is Part of the Description)
1 transponder
2 material strip
3 inner side of the tire
4 substrate
5 transponder chip
6 component region wherein the material strip is fixedly attached to the inner side of the tire
7 substrate opening
8 fixing means on the substrate
9 material strip opening

The invention claimed is:

1. A transponder arrangement for mounting on an inner wall surface of a tire, the transponder arrangement comprising:
    a substrate having an upper surface and a lower surface defining a predetermined area;
    a transponder including a transponder chip and a transponder antenna embedded in said substrate;
    a strip of material having first and second longitudinal ends and an overall area so as to permit said substrate to lie entirely on said strip of material;
    said strip having a first portion defining said first longitudinal end and a second portion defining said second longitudinal end;
    said second portion having a middle tab so as to have leg segments on respective sides thereof;
    said first portion and said leg segments of said second portion being fixedly connected to said inner wall surface of said tire;
    said middle tab being clear of and unattached to said inner wall surface of said tire;
    said substrate having a clear-through opening formed therein through which said middle tab passes from below said substrate; and,
    said middle tab being releasably connected to said substrate at said upper surface thereof so as to enable said substrate to lie on said first portion and said leg segments thereby avoiding a direct contact of said substrate with said inner wall surface of said tire.

2. The transponder arrangement of claim 1, wherein said opening is a slot formed in said substrate and said substrate is connected only to said middle tab.

3. The transponder arrangement of claim 2, further comprising fixing means projecting from said upper surface of said substrate and releasably connecting said middle tab to said substrate.

4. The transponder arrangement of claim 3, wherein said middle tab has an aperture formed therein for fixing said middle tab to said fixing means.

5. The transponder arrangement of claim 1, wherein said substrate opening has a rectangular shape and has rounded or beveled edges.

6. The transponder arrangement of claim 1, wherein said strip of material is made of a rubber product.

* * * * *